United States Patent [19]
Lee et al.

[11] Patent Number: 5,933,620
[45] Date of Patent: *Aug. 3, 1999

[54] METHOD AND APPARATUS FOR SERIALIZING MICROPROCESSOR IDENTIFICATION NUMBERS

[75] Inventors: Sherman Lee, Rancho Palos Verdes, Calif.; James R. MacDonald, Buda; Michael T. Wisor, Austin, both of Tex.

[73] Assignee: Advanced Micro Devices, Inc., Sunnyvale, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/623,022

[22] Filed: Mar. 28, 1996

[51] Int. Cl.$^6$ ....................................................... G06F 12/14
[52] U.S. Cl. .............................. 395/500; 364/488; 380/3; 380/4
[58] Field of Search ..................................... 395/500, 384, 395/704; 364/488; 380/3, 4

[56] References Cited

U.S. PATENT DOCUMENTS

| | | | |
|---|---|---|---|
| 4,432,051 | 2/1984 | Bogaert et al. | 395/704 |
| 4,633,388 | 12/1986 | Chiu | 395/384 |
| 4,652,990 | 3/1987 | Pailen et al. | |
| 5,029,207 | 7/1991 | Gammie | |
| 5,068,894 | 11/1991 | Hoppe | |
| 5,133,055 | 7/1992 | Lieberman et al. | |
| 5,153,918 | 10/1992 | Tuai | |
| 5,182,770 | 1/1993 | Medveczky et al. | |
| 5,237,610 | 8/1993 | Gammie et al. | |
| 5,276,738 | 1/1994 | Hirsch | |
| 5,319,705 | 6/1994 | Halter et al. | |
| 5,467,304 | 11/1995 | Uchida et al. | |
| 5,675,825 | 10/1997 | Dreyer et al. | |

FOREIGN PATENT DOCUMENTS

| | | |
|---|---|---|
| 0 302 710 A2 | 2/1989 | European Pat. Off. |
| 0 421 409 A2 | 4/1990 | European Pat. Off. |
| 0 707 270 | 4/1996 | European Pat. Off. |
| 2 205 667 | 12/1988 | United Kingdom |
| 85 02310 | 5/1995 | WIPO |

OTHER PUBLICATIONS

XP000072642 Ferreira, R.C., "The Smart Card: A High Security Tool in EDP," Phillips Telecommunication Review, vol. 47, No. 3, Sep. 1989, pp. 1–19.
Dallas Semiconductor Corp.: "Selection 1: Introduction," Oct. 6, 1993, Data Book Soft Microcontroller, pp. 1–3, 07/08, 73, 77–80, 82, 229, 290–292.
Electronics, "Designer's Dream Machine," vol. 60, No. 5, Mar. 1987, New York, US, pp. 53–57.
International Search Report for PCT/US 97/05192 dated Aug. 4, 1997.
$AMD5_K86$ Processor Technical Reference Manual, 1986 Advanced Micro Devices, Inc., pp. 3–29 through 3–31.

*Primary Examiner*—Vincent N. Trans
*Attorney, Agent, or Firm*—Conley, Rose & Tayon, PC; B. Noel Kivlin

[57] ABSTRACT

A method and apparatus for providing a microprocessor serial number. A small, nonvolatile random access memory is packaged with the CPU die to provide a storage space for a CPU serial number which can be programmed before leaving the factory. Both the CPU die and the nonvolatile RAM die reside within the cavity of the package. Connection between the two die is provided by conventional wire bonding.

20 Claims, 8 Drawing Sheets

METHOD AND APPARATUS FOR SERIALIZING MICROPROCESSOR IDENTIFICATION NUMBERS

FIELD OF THE INVENTION

The present invention relates to serializing microprocessor identification numbers and particularly to a system and method for storing microprocessor serial numbers in a nonvolatile random access memory packaged with a central processing unit die.

DESCRIPTION OF THE RELATED ART

For some time, workstations, minicomputers, and mainframes have had serial numbers embedded in them which uniquely identify them. Addition of a serial number allows a manufacturer to trace a product in the field back to the original equipment manufacturer (OEM). This allows the manufacturer greater control over its product. In addition, provision of a serial number permits independent software vendors to register their products. Microprocessors and personal computers typically have not been tracked by serial number, partly due to the added expense of providing circuitry to store and/or read a serial number.

As the complexity of the microprocessors themselves has increased, however, it is becoming increasingly cost-effective to provide additional circuitry and/or process steps to provide a serial number. Moreover, a serial number may be associated with particular software. Thus, for example, software that is installed on a particular processor may read a password and thereafter be keyed to the particular microprocessor wherein an attempt to install the software on a different processor would fail. Nevertheless, standard methods of providing serial number identification in a computer system are generally expensive; in a competitive microprocessor market, it is desirable to keep such costs at a minimum. Accordingly, there is a need for an inexpensive, yet effective way of providing a serial number with a microprocessor in order to trace a product in the field back to the original equipment manufacturer (OEM).

A problem with providing a microprocessor serial number in machine readable form is that it can become accessible to unauthorized users and thus susceptible to unauthorized alteration. Accordingly, there is a need for a mechanism to prevent unauthorized access to a machine readable serial number.

Still another problem with providing a microprocessor serial number and serializing the software is that if the processor is upgraded or otherwise replaced, the software will cease to function. (Serializing software is herein defined as providing a CPU serial number to a given set of software. The software will be not able to run on a processor not having that serial number.) However, to the software, there is little difference between being loaded onto an unauthorized computer system and having an unauthorized processor provided to it. In either case, the software will be keyed to a processor that is no longer present and will not function. Accordingly, what is needed is an upgrade method whereby serialized software can detect that it is running on an unauthorized processor and in response thereto can initiate a reauthorization process. If the reauthorization process is successful, the software will function on the upgrade processor. Failure at the reauthorization process, however, will mean that the software itself is loaded onto an unauthorized system and, hence, not function.

As discussed above, it is also desirable to serialize software. To do so, however, it is desirable to provide an easy method of accessing the serial number by the software while at the same time maintaining the serial number's inaccessibility to unauthorized changes.

SUMMARY OF THE INVENTION

Accordingly, there is provided a unique system and method for providing a microprocessor serial number. A mechanism is provided for storing a microprocessor serial number in a nonvolatile random access memory formed within the same device package as the processor. The microprocessor serial number is encrypted using a double-key encryption scheme in order to prevent unauthorized access and alteration. An encryption key is itself encoded to provide easy access to an authorized user, while preventing unauthorized reading of the serial number. Finally, there is provided a method whereby software that has been serialized to a particular processor can detect that it is running on an unauthorized processor and request reauthorization. The present invention thereby permits a microprocessor serial number to be provided in an inexpensive and secure fashion. Thus, manufacturers and independent software vendors can economically obtain greater control over their products.

Accordingly, there is provided a small, nonvolatile random access memory packaged with the CPU die to provide a storage space for the CPU serial number which can be programmed before leaving the factory. Both the CPU die and the nonvolatile RAM die reside within the cavity of the package. Connection between the two die is provided by conventional wire bonding and kept to a minimum by providing a serial interface between the RAM and the CPU.

In accordance with another aspect of the present invention, access to the nonvolatile RAM storing the CPU serial number is controlled by encryption and logic on the processor. Two small layered encryption keys are used to increase security of the mechanism. The serial number may be changed only if both keys are correct. The keys and encryption algorithm are known only to the manufacturer. Register space is provided for an 80-bit serial number and two 32-bit keys. A checksum is included in the data stored in the RAM to allow detection of errors in the transfer of the RAM data to and from the CPU.

In accordance with yet another aspect of the present invention, an upgrade method is provided whereby serialized software detects that it is running on an unauthorized processor and initiates a reauthorization process based on a reauthorization use profile. The temporary reenabling of the software is allowed if the authorization service is not available or not allowed. Limited use is provided to the user until the problem is resolved.

In accordance with still another aspect of the claimed invention, a code sequence is provided for detecting a serialized CPU, extracting the CPU serial number and providing it to applications by a standard application program interface (API).

Broadly speaking, the invention contemplates a device package having a die cavity, a CPU fabricated on a first die, and an NVRAM fabricated on a second die within the die cavity. The NVRAM is configured to store the microprocessor serial number.

BRIEF DESCRIPTION OF THE DRAWINGS

A better understanding of the present invention can be obtained when the following detailed description of the preferred embodiment is considered in conjunction with the following drawings, in which.

Figure 1A:
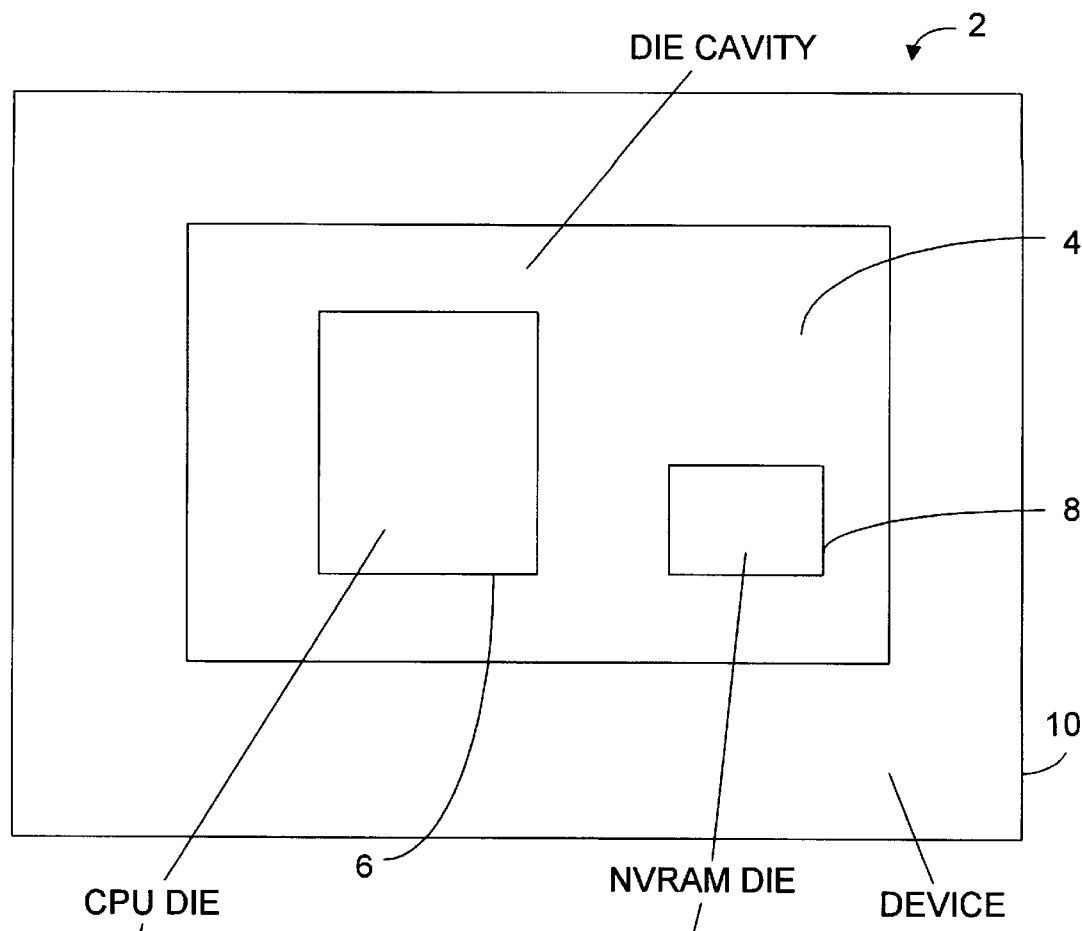
FIG. 1a and FIG. 1b are block diagrams showing a nonvolatile RAM die and CPU die sharing a device package in accordance with one embodiment of the claimed invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives following within the spirit and scope of the present invention, as defined by the appended claims.

DETAILED DESCRIPTION OF THE INVENTION

Figure 1B:
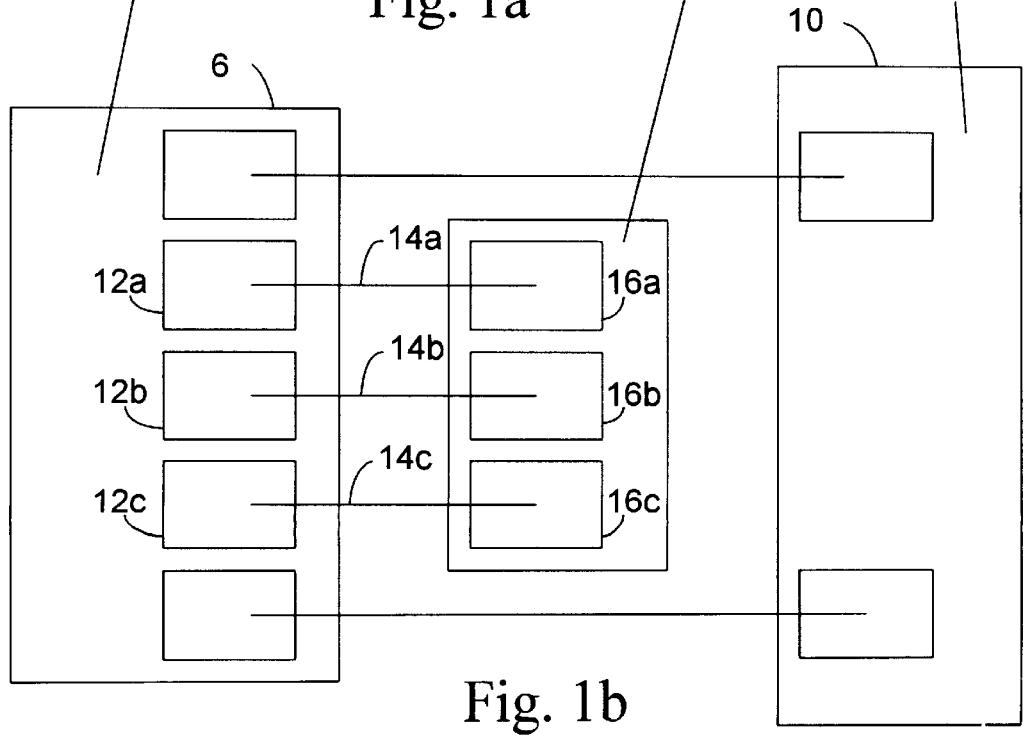

Turning now to FIG. 1a, a diagram is shown of an integrated circuit package which includes central processing unit (CPU) die 6, nonvolatile random access memory (NVRAM) die 8, die cavity 4, and device package 10. In a preferred embodiment, NVRAM die is formed separately from CPU die 6. Turning now to FIG. 1b, NVRAM die 8 is coupled to CPU die 6 by means of signal lines 14a, 14b, 14c. Signal lines 14a, 14b, and 14c are attached to CPU die 6 and NVRAM die 8 by means of bond pads, 12a, 12b, 12c and 16a, 16b, 16c, respectively. In one embodiment, signal line 14a is a transmit line; signal line 14b is a receive line; and signal line 14c is a clock line, and form a serial interface between the NVRAM and the CPU. In an alternative embodiment, NVRAM die 8 may be connected to CPU die 6 by means of a single transmission line. In that embodiment, the CPU and NVRAM include additional circuitry to provide the serial interface. The NVRAM is programmed with the CPU serial number prior to leaving the factory.

Figure 2:
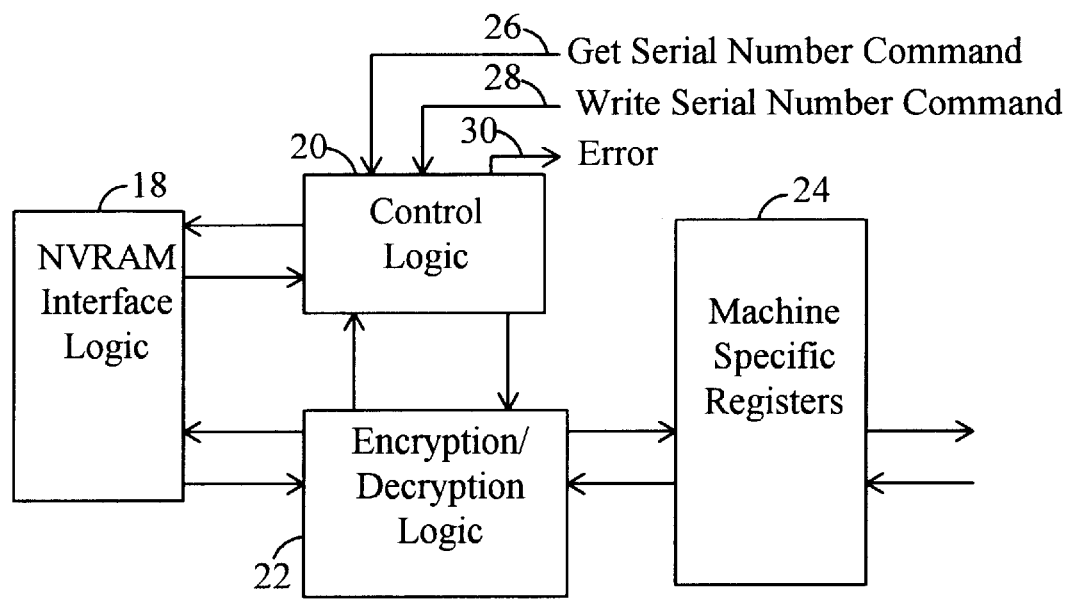
FIG. 2 is a block diagram of one embodiment of an encryption system in accordance with one embodiment of the present invention.

While providing the CPU serial number in NVRAM packaged with the CPU die provides cost advantages over, for example, permanently etching a serial number onto the die, a mechanism is needed to prevent unauthorized access to the serial number. Access to the NVRAM, and hence the serial number, is controlled via encryption keys and logic on the processor. Turning now to FIG. 2, there is shown a block diagram of an exemplary encryption mechanism. The CPU includes NVRAM interface logic 18, coupled to control logic 20 and encryption/decryption logic 22. Control logic 20 and encryption/decryption logic 22 are further coupled to one another. Control logic 20 supervises the read, write serial number processes. Encryption/decryption logic 22 performs the encryption and decryption of the serial number as described below. Encryption/decryption logic 22 is also coupled to machine or model specific registers 24. Machine specific registers 24 provide the programmers interface and are of a type common in advanced x86-type processors and include command and/or status bits (e.g., unlock, read, etc.). It should be noted, however, that the use of other processors or registers is contemplated. Control logic 20 is further coupled to Get Serial Number command line 26, Write Serial Number command line 28, and Error line 30. NVRAM interface logic 18 controls transfers to and from the NVRAM.

Figure 3:
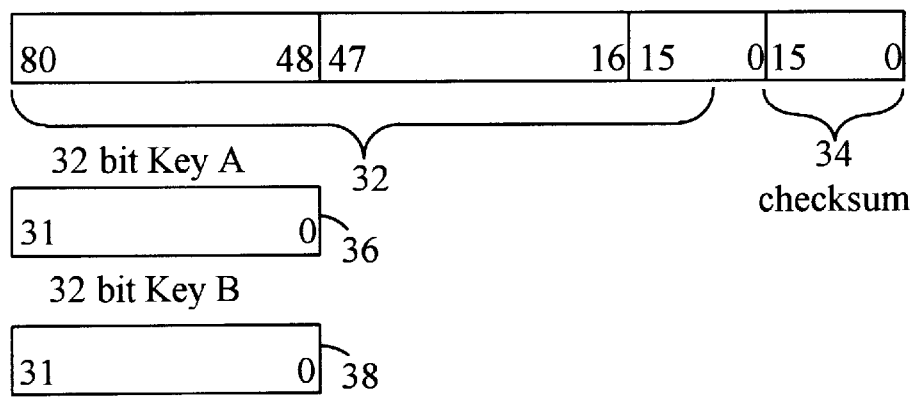
FIG. 3 is a diagram of a register set encryption system in accordance with one embodiment of the present invention.

FIG. 3 illustrates 80-bit serial number 32, 32-bit key A 36, and 32-bit key B 38. Eighty bit serial number 32, and keys 36, 38 are stored in machine specific registers 24. Sixteen bit checksum 34 is further included in the data stored in the NVRAM to allow detection of errors in the transfer of the data to and from the CPU. However, the checksum 34 is not used in the encryption process. A layered encryption method using the two keys 36, 38 is employed to increase the security of the mechanism. The serial number itself may be changed only if both keys 36, 38 are correct. The keys and the encryption algorithm are known only to the manufacturer.

Figure 4A:
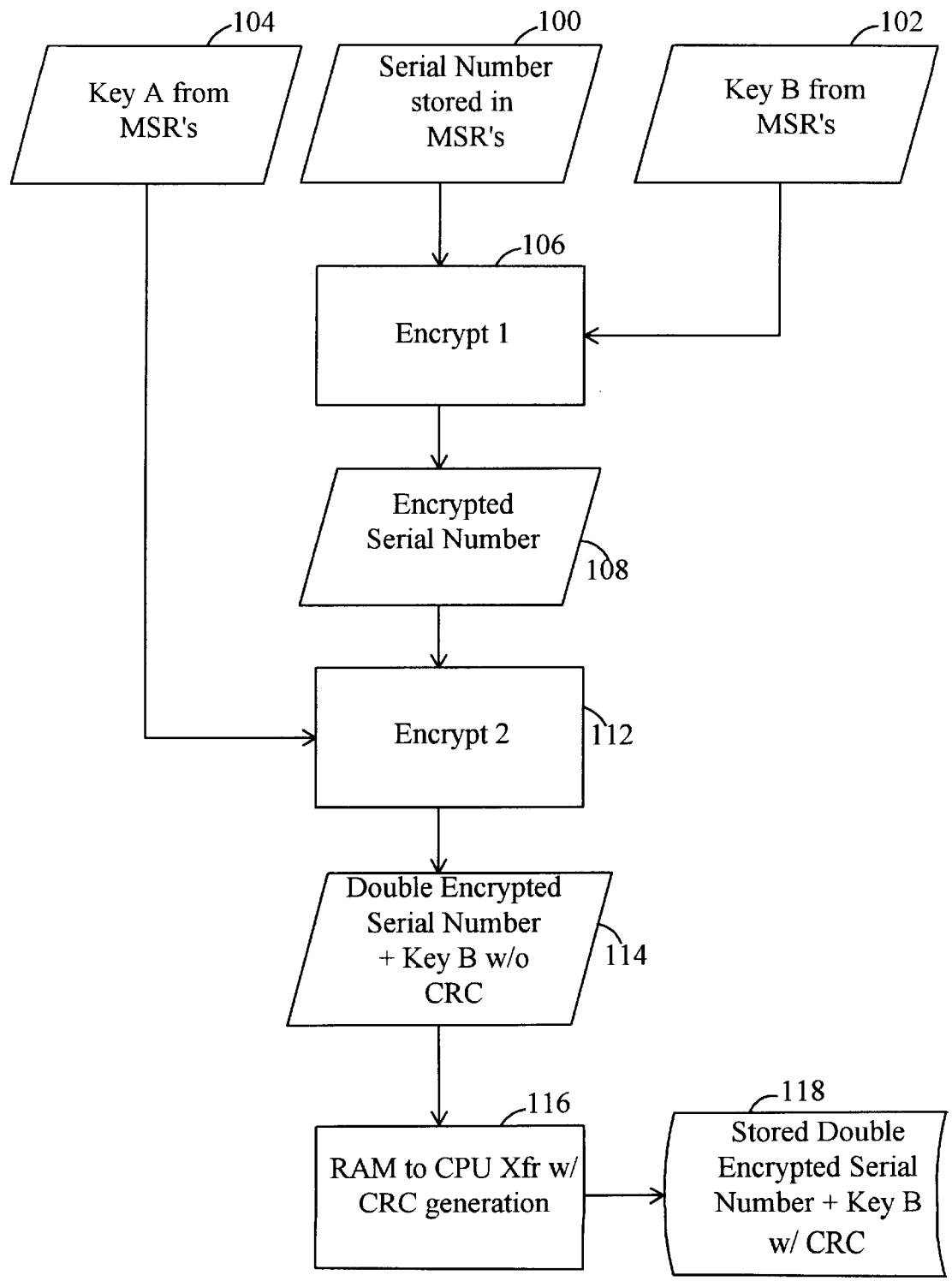
FIGS. 4a, 4ba and 4c are flowcharts illustrating the write-read and unlock processes of encrypting in accordance with one embodiment of the present invention.

Turning now to FIG. 4a, a flow diagram of a write process used to write a new serial number is shown. Initially, serial numbers are provided in the machine specific registers (MSR) 24 (step 100), as are keys 36, 38 (step 104, step 102). Next, in step 106, key 38 is used to provide a first level of encryption to the serial number stored in the machine specific registers 24. The encrypted serial number (step 108) and key B are then further encrypted using key A in step 112. The now double-encrypted serial number are shown in step 114, with cyclical redundancy checksum (CRC). Next, in step 116, the double encrypted serial number with encrypted key B is output to the NVRAM using CRC generation. In step 118, the resulting encrypted serial number with CRC is stored.

Figure 4B:
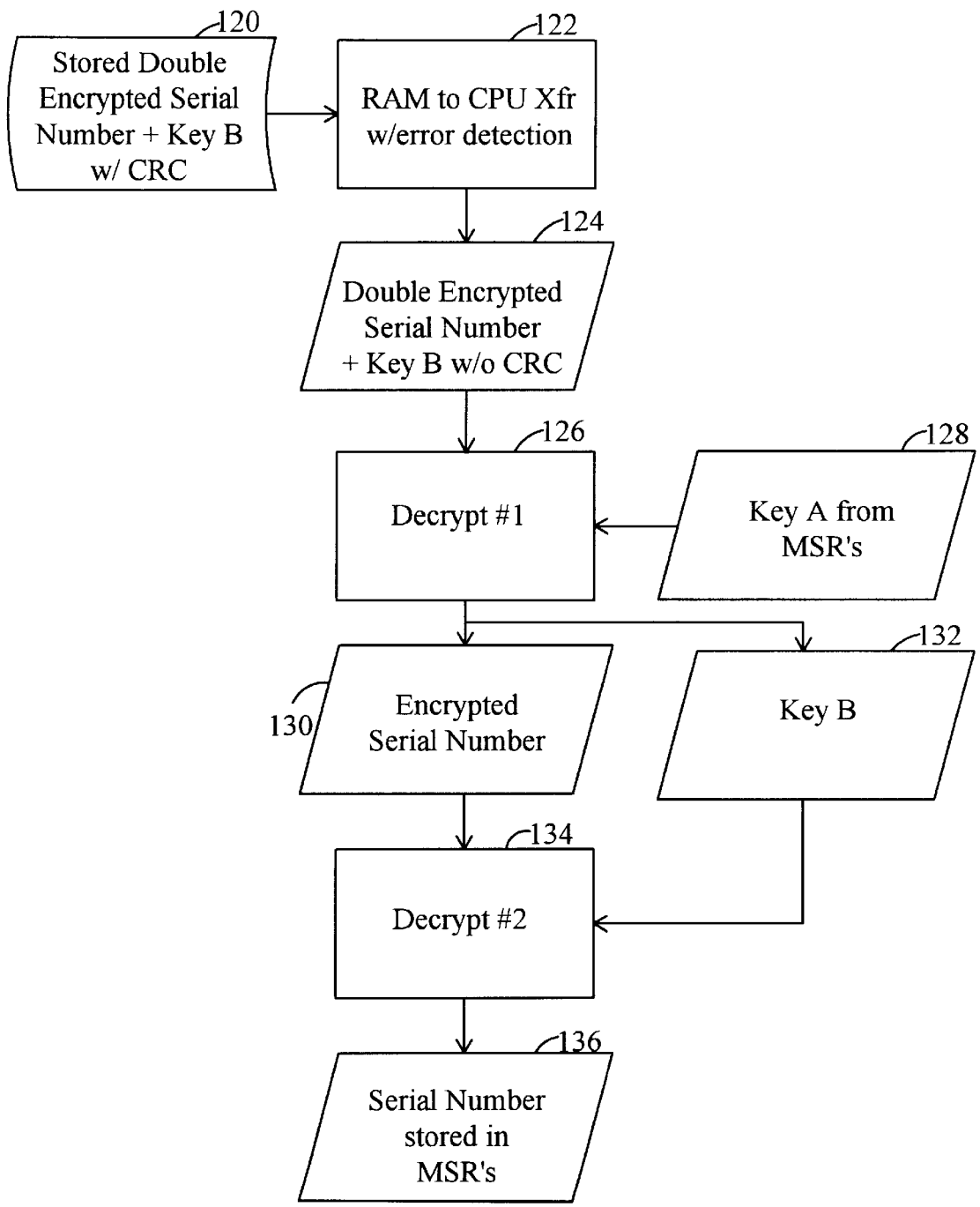
Figure 7:
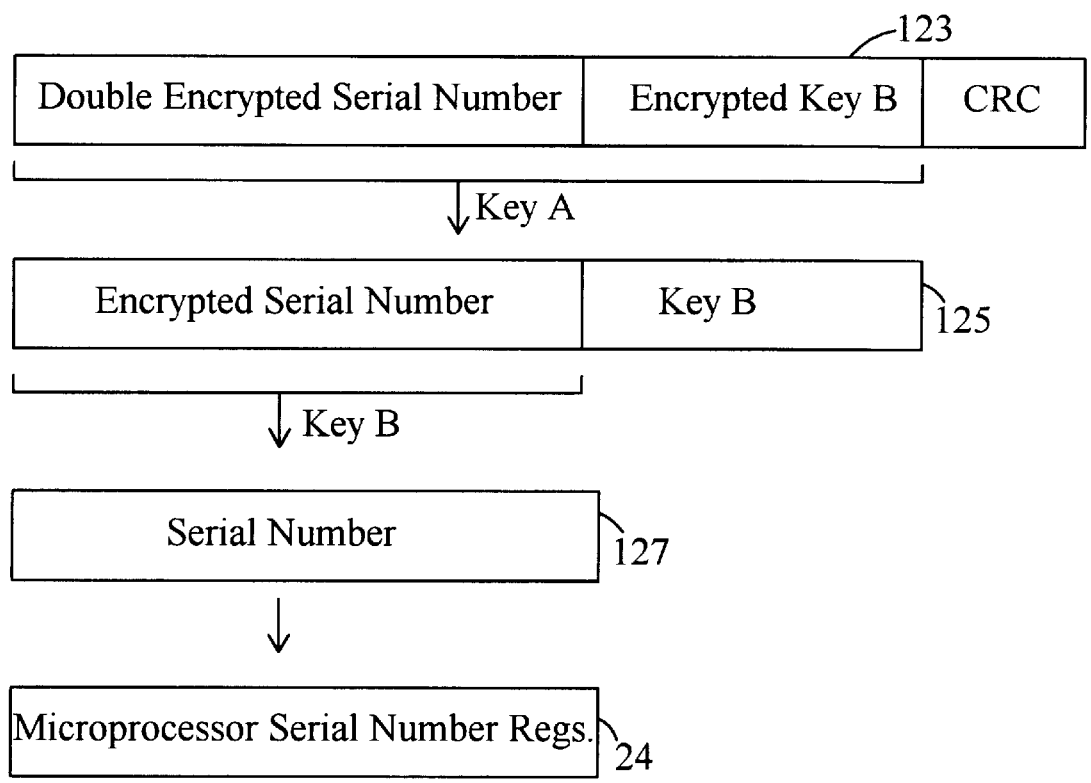
FIG. 7 is a diagram illustrating encryption in accordance with one embodiment of the present invention.

Turning now to FIG. 4b, a flow diagram of a read process is shown. The stored double-encrypted serial number and encrypted key B with CRC is initially stored (step 120) in the NVRAM. In step 122, an NVRAM to CPU transfer occurs using error detection. The resulting double-encrypted serial number and encrypted key B without CRC (step 124) is then decrypted in step 126 using key A from the machine specific registers (step 128). Having decrypted using key A in step 130, what remains is the encrypted serial number with key B (step 132). Key B is then used to decrypt the encrypted serial number in step 134. The resulting completely decrypted serial number is then stored in the machine service registers in step 136. A schematic representation of the decryption process may be found in FIG. 7. Key A is applied to double-encrypted serial number and encrypted key B 123. The resulting encrypted serial number 125 is then decrypted using key B. The resulting serial number 27 is then stored in microprocessor serial number (or machine specific) register 24.

Figure 4C:
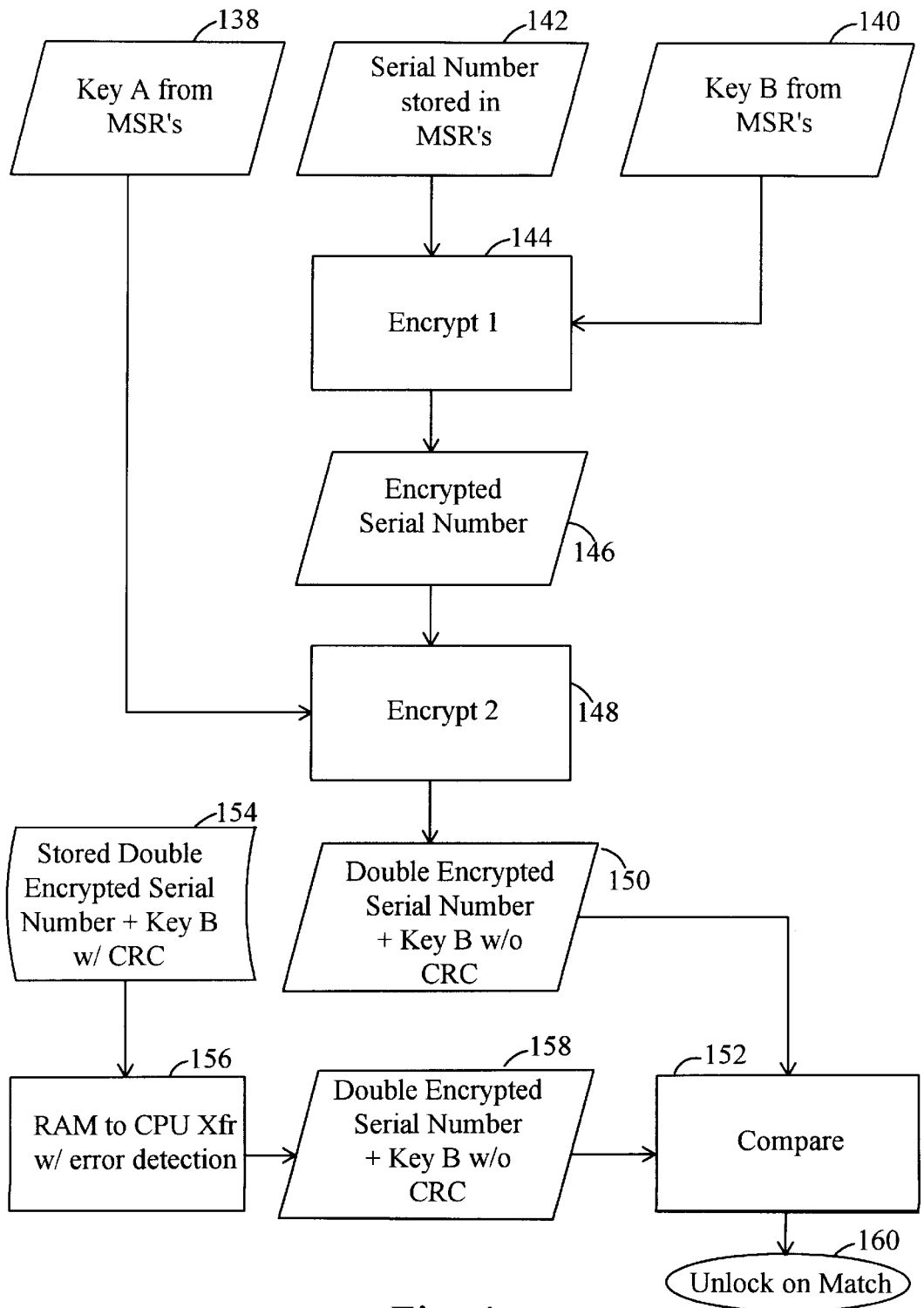

The above described read and write processes are permitted only in the event that the CPU is in an unlocked state. This can occur upon programming of a new serial number for the first time. For example, when the processor is first assembled, the NVRAM is zeroed out. The processor will detect this state and enter the unlocked state which will allow the initial serial number to be programmed by the write method described above. If, however, the device previously had a serial number within it, the unlock sequence described below must be run in order to reprogram the serial number. More particularly, turning now to FIG. 4c, in an initial state, the serial number is stored in the machine specific registers, as are keys A, B (steps 138, 140, and 142). The serial number is then encrypted using key B in step 144. The resulting encrypted serial number (step 146) and key B are further encrypted in step 148 using key A. The resulting in step 152. At the same time, the previously stored double-encrypted serial number with encrypted key B and CRC (step 154) is transferred from NVRAM to the CPU with the appropriate error detection in step 156. In step 158, the double-encrypted serial number and key B is output to the comparator (step 152). The two outputs from steps 150 and 158 are compared in comparator 152. If there is a match, the processor will enter an unlock state (step 160).

As can readily be appreciated, the processes described above are necessarily processor specific. Increasingly, however, easy upgrades of processors are available. A processor upgrade will cause software that is linked to the processor's serial number ("serialized software") to cease functioning. In accordance with one aspect of the claimed invention, a method is provided whereby serialized software can detect that it is running on an upgraded (unauthorized) processor and will initiate a reauthorization process. In a preferred embodiment, the reauthorization procedure is carried out through use of a series of application programming interfaces (API). The relevant APIs are set forth below:

---

Read_CPU_Serial_Number
This function allows the OS and application calling it to enable the reading
of the CPU serial number. In one embodiment, in order to read the serial number a 32-bit key must be entered as well as setting a
read_serial_number bit in the appropriate MSR.
    Entry:
        MSR to be accessed for the serial number.
        The 32 bit key
    Exit:
        CPU Serial Number
Upgrade_CPU_Serial_Number
This function will perform the automatic upgrade and re-authorization process when a CPU upgrade has occurred.
    Entry:
        New serial number
        Old serial number
    Exit:
        Authorization == 0 - not allowed
        Authorization == 1 - allow upgrade
Lock_With_New_CPU_Serial_Number
If the Upgrade_CPU returns an Authorization = 1 then the corresponding application will take the appropriate actions to change the software locking
scheme utilized.
    Entry:   New serial number
    Exit:    Success == 1 -> lock with new serial number OK
                Success == 0 -> lock with new serial number FAILED
Get_Previous_CPU_Serial Number
This function provides a mechanism for the OS and application to retrieve what the previous CPU serial number stored into the system.
    Entry:
        nothing
    Exit:
        Success == 1 or 0
        if Success == 1
            Previous CPU serial number stored by the system
        else
            nothing

---

Figure 5:
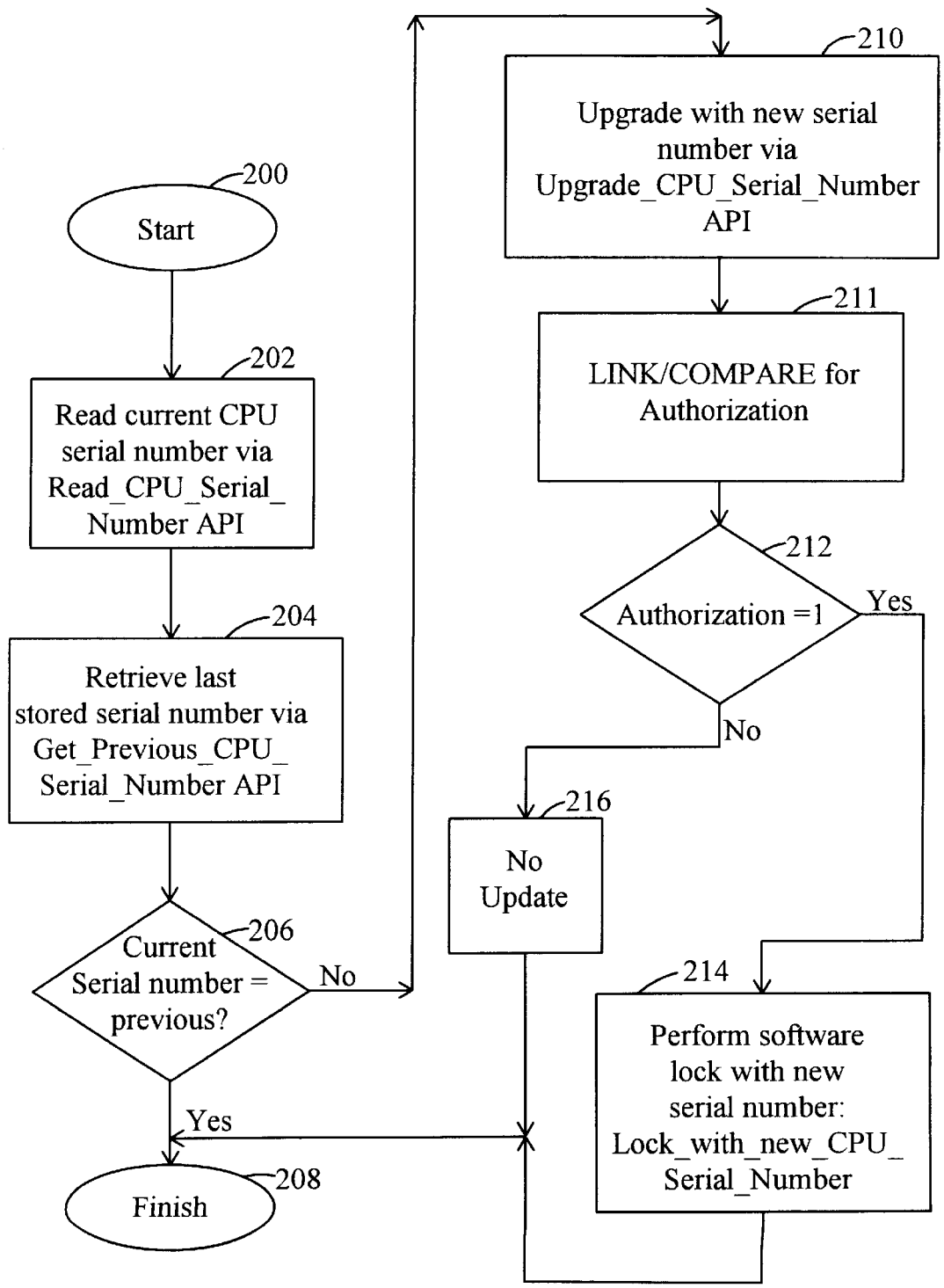
FIG. 5 is a flowchart illustrating an upgrade reauthorization system in accordance with one embodiment of the present invention.

The authorization process is detailed in FIG. 5. The procedure is initiated in step 200. At step 202, the current CPU serial number of the installed microprocessor is read via the Read_CPU_Serial_Number API command described above. In the next step, step 204, the most recently stored serial number is retrieved via the Get_Previous_ CPU_Serial Number API command. If the current CPU serial number is the same as the previous CPU serial number (step 206), then the process is finished in step 208. If, however, the two are not equal, then in step 210, the Upgrade_CPU_Serial_Number API command will be initiated and authorization sought. Authorization is obtained by contacting the vendor via a telephone voice, data, Internet connection 211 or other remote connection. Based on an authorization use profile, the reenabling of the software may be allowed in step 212. If authorization is permitted, then in step 214, the software lock will be performed using the new CPU serial number and the Lock_with_new_CPU_ serial_number API command (step 214). If authorization is not allowed, then in step 216, the upgrade will not be permitted. In either case, the process is completed in step 208. If the authorization service routine is not available, or authorization is denied, then one embodiment contemplates an API for allowing limited use so that the user may use this system until the problem is resolved.

One potential gap in the encryption mechanism described above is that the 32-bit key A and 32-bit key B are stored in the machine specific registers. It should be noted that, although both keys are necessary to write the serial number, only one need be provided to read it. Accordingly, the key value that is needed to read the serial number must be encoded in order to protect against users retrieving the key value. In addition, it is desirable to reduce the data size of the key from four bytes to one or two bytes in order to preserve CMOS. This aspect of the claimed invention is best described in reference to FIG. 6 as well as the APIs described below:

---

Initialize_Key
This function can only be initiated by the systems manufacturer. The purpose of this function is to facilitate the storage of the 32-bit key value into the CMOS. This function will encode the key and store into CMOS.
    Entry:
        32-bit Key value
        CMOS index for storage of the encoded value
    Exit:
        Nothing
Encode_And_Store_Key
This function will be called by the Initialize_Key function. This function will encode the key and store it in the system CMOS. The key will not be 100% protected but will prevent the normal users from decoding the key information from system CMOS memory.
    Entry:
        32-bit Key value
        CMOS index for storage of the encoded value
    Exit:
        Nothing
Decode_Key
This function will retrieve the encoded key value from CMOS and decode it for use
    Entry:
        CMOS index for stored encoded key value
    Exit:
        32-bit Key value
The following diagram illustrates the system software access and control of the serial number and key.

---

Figure 6:
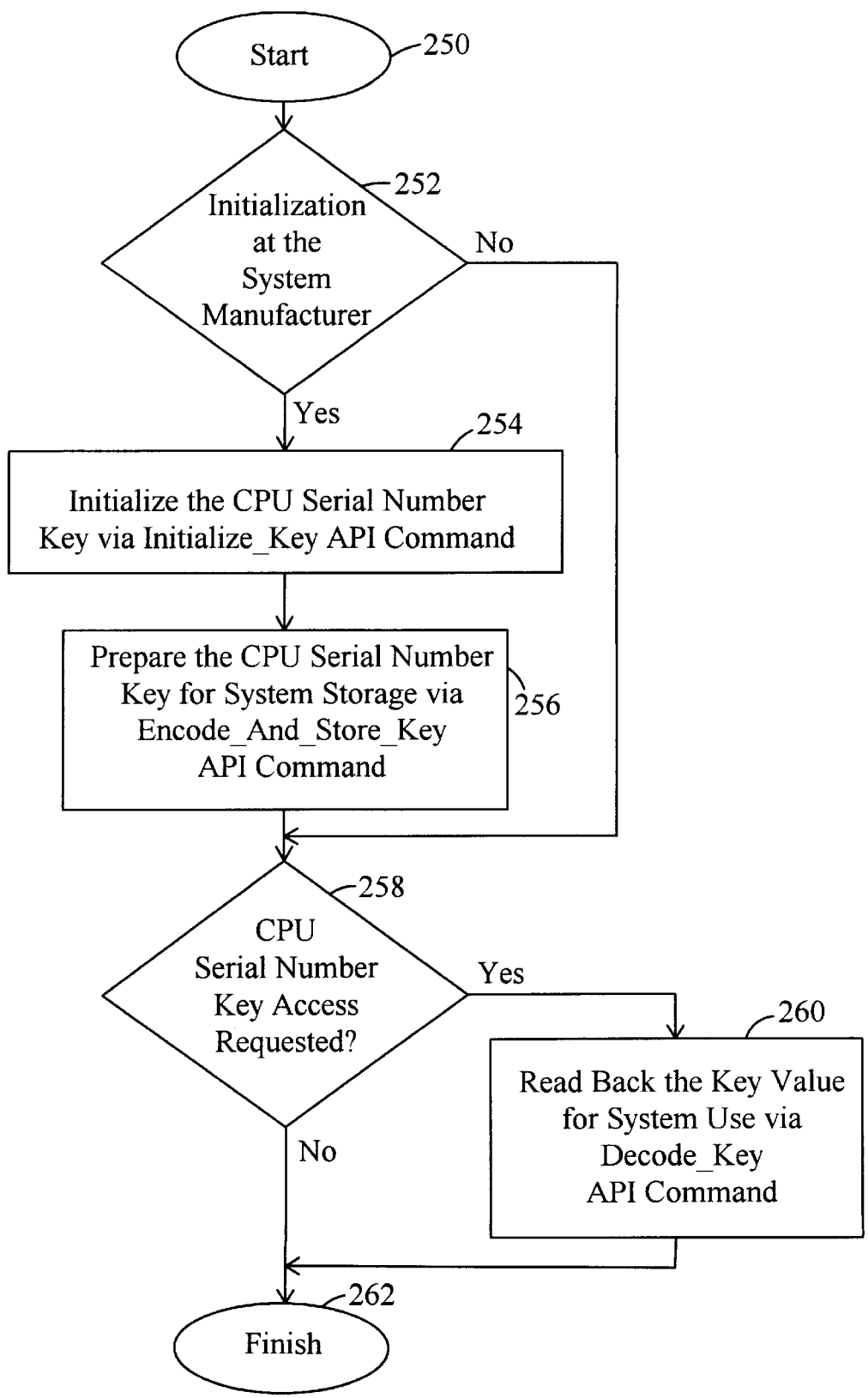
FIG. 6 is a flowchart illustrating accessing the serial number is accordance with one embodiment of the present invention.

More particularly, with reference to FIG. 6, coding the serial number key begins at step 250. If the systems manufacture has initialized the key (step 252), then the Initialize_Key API command will be asserted (step 254), in order to initialize the serial number key. Upon initialization, the CPU serial number key is prepared for system storage (step 256) via the Encode_and_Store_Key API command. Among other things, the Encode_and_Store Key API command will encode the key. For example, the function may provide a summation of the key bytes and store them in system CMOS or a more complex encoding. If key access is not requested (step 258), then the process is completed (step 252). If, however, the key number access is requested, then the key value is read back for system use (step 260) using the Decode_Key API command. Once the key value has been retrieved, reading the serial number may proceed as described above. While the above system and method will not provide complete protection against unauthorized access to the key or serial number, the casual user will not be able to gain unauthorized access.

The invention described in the above-detailed description is not intended to be limited to the specific form set forth herein, but on the contrary, it is intended to cover such alternatives, modifications, and equivalents as can reasonably be included within the spirit and scope of the invention as defined by the appended claims.

We claim:

1. An apparatus for selectively executing software on a microprocessor platform, comprising:
   a device package having a die cavity;
   a nonvolatile random access memory (NVRAM) fabricated within said die cavity on a first die, wherein said NVRAM is configured to store encrypted serial number data, wherein said encrypted serial number data includes an encrypted microprocessor serial number and an encrypted key;
   a central processing unit fabricated within said die cavity on a second die and coupled to said NVRAM through a serial interface with at least one signal line, wherein said central processing unit includes:
      a nonvolatile random access memory interface (NVRAM interface) coupled to the serial interface for receiving said encrypted serial number data from said NVRAM;
      a first register configured to store a first key;
      an encryption/decryption module coupled to said NVRAM interface configured (a) to generate a partially decrypted microprocessor serial number and a decrypted key from said encrypted serial number data using the first key, and (b) to generate a fully decrypted microprocessor serial number from said partially decrypted microprocessor serial number using said decrypted key, wherein said encryption/decryption module stores said fully decrypted microprocessor serial number in a second register;
   wherein a software program executing on said central processing unit is configured to provide said first key to said first register and to read said fully decrypted microprocessor serial number from said second register, wherein said software program is further configured to selectively enable subsequent execution of said software program in response to the value of said fully decrypted microprocessor serial number.

2. The apparatus of claim 1, wherein the software program is configured (a) to read a previously used microprocessor serial number from a first system memory location, (b) to compare the previously used microprocessor serial number with the fully decrypted microprocessor serial number accessed from said second register, (c) to establish contact with an authorization agent and to request permission from said authorization agent to operate with said central processing unit in response to said previously used microprocessor serial number not matching said fully decrypted microprocessor serial number.

3. The apparatus of claim 2, wherein said software program calls a first application programming interface (API) routine to read the first key from said first system memory location, wherein the first key is stored in said first system memory location in an encoded form.

4. The apparatus of claim 2, wherein the software program is configured to establish contact with the authorization agent by initiating an Internet connection to the authorization agent.

5. The apparatus of claim 2 wherein the authorization agent coincides with a manufacturer of said software program.

6. The apparatus of claim 1, wherein said encrypted serial number data includes a cyclical redundancy checksum (CRC), wherein said NVRAM interface uses said CRC to verify proper transmission of said encrypted serial number data from said NVRAM through said serial interface.

7. The apparatus of claim 1, wherein said encrypted serial number data is programmed into the NVRAM by a first manufacturer of said apparatus.

8. The apparatus of claim 1, wherein said first register and said second register comprise machine specific registers.

9. The apparatus of claim 1, wherein said at least one signal line is coupled to said NVRAM and said central processing unit by a plurality of wire bond pads.

10. The apparatus of claim 1, wherein said encryption/decryption module is further configured (a) to access a non-encrypted microprocessor serial number from said second register, (b) to access a second key from a third register, (c) to generate a partially encrypted microprocessor serial number from said non-encrypted microprocessor serial number using said second key, (d) to access said first key from said first register, (e) to generate a fully encrypted microprocessor serial number and an encoded key from said partially encrypted microprocessor serial number and said second key respectively using said first key, (e) to compare said fully encrypted microprocessor serial number and said encoded key with said encrypted serial number data stored in said NVRAM, and (f) to enter an unlocked state if a match is determined.

11. A method for selectively executing software on a microprocessor platform, the method comprising:
   fabricating a central processing unit on a first die, wherein said fabricating a central processing unit includes fabricating a nonvolatile random access memory interface (NVRAM interface) and an encryption/decryption module;
   fabricating a non-volatile random access memory (NVRAM) on a second die;
   placing said central processing unit and said NVRAM in a die cavity of a device package;
   coupling said central processing unit to said NVRAM through a serial interface with at least one signal line;
   said NVRAM interface accessing encrypted serial number data comprising an encrypted microprocessor serial number and an encrypted key from said NVRAM through said serial interface;
   said encryption/decryption module generating a partially decrypted microprocessor serial number and a decrypted key from said encrypted serial number data using a first key stored in a first register in said central processing unit;
   said encryption/decryption module generating a fully decrypted microprocessor serial number from said partially decrypted microprocessor serial number using said decrypted key;
   said encryption/decryption module storing said fully decrypted microprocessor serial number in a second register in said central processing unit;

said software program providing said first key to said first register and reading said fully decrypted microprocessor serial number from said second register;

said software program selectively enabling subsequent execution of said software program in response to the value of said fully decrypted microprocessor serial number.

12. The method of claim 11 further comprising:

said software program reading a previously used microprocessor serial number from a first system memory location;

said software program comparing said previously used microprocessor serial number with the fully decrypted microprocessor serial number;

said software program establishing contact with an authorization agent and requesting permission from the authorization agent to operate with said central processing unit in response to said previously used microprocessor serial number not matching said fully decrypted microprocessor serial number.

13. The method of claim 12, wherein said reading of the previously used microprocessor serial number includes said software program calling a first application programming interface routine to read the first key from a first system memory location, wherein the first key is stored in the first system memory location in encoded form.

14. The method of claim 12, wherein said establishing contact with the authorization agent includes initiating an Internet connection to the authorization agent.

15. The method of 12, wherein the authorization agent coincides with a manufacturer of said software program.

16. The method of claim 11 further comprising using a cyclic redundancy checksum to verify transmission of said encrypted serial number data from said NVRAM to said NVRAM interface through said serial interface.

17. The method of claim 11 further comprising a first manufacturer of said central processing unit programming said encrypted serial number data into said NVRAM.

18. The method of claim 11, wherein said first register and said second register comprise machine specific registers.

19. The method of claim 11, wherein said coupling of said central processing unit to said NVRAM with at least one signal line including attaching said signal line to said central processing unit and said NVRAM using a plurality of bond pads.

20. The method of claim 11 further comprising said encryption/decryption module (a) accessing a non-encrypted microprocessor serial number from said second register, (b) accessing a second key from a third register, (c) generating a partially encrypted microprocessor serial number from said non-encrypted microprocessor serial number using said second key, (d) accessing said first key from said first register, (e) generating a fully encrypted microprocessor serial number and an encoded key from said partially encrypted microprocessor serial number and said second key respectively using said first key, (e) comparing said fully encrypted microprocessor serial number and said encoded key with said encrypted serial number data stored in said NVRAM, and (f) entering an unlocked state if a match is determined.

* * * * *